United States Patent
Lim

(10) Patent No.: US 9,091,887 B2
(45) Date of Patent: Jul. 28, 2015

(54) LIQUID CRYSTAL DISPLAY DEVICE AND METHODS FOR MANUFACTURING THE SAME

(75) Inventor: Yong Woon Lim, Seoul (KR)

(73) Assignee: Samsung Display Co., Ltd. (KR)

( * ) Notice: Subject to any disclaimer, the term of this patent is extended or adjusted under 35 U.S.C. 154(b) by 24 days.

(21) Appl. No.: 13/598,341

(22) Filed: Aug. 29, 2012

(65) Prior Publication Data

US 2013/0271686 A1 Oct. 17, 2013

(30) Foreign Application Priority Data

Apr. 13, 2012 (KR) ........................ 10-2012-0038674

(51) Int. Cl.
| | |
|---|---|
| G02F 1/1337 | (2006.01) |
| G02F 1/141 | (2006.01) |
| C09K 19/02 | (2006.01) |
| C09K 19/20 | (2006.01) |
| C09K 19/34 | (2006.01) |
| C09K 19/04 | (2006.01) |

(52) U.S. Cl.
CPC ...... *G02F 1/133788* (2013.01); *C09K 19/0225* (2013.01); *C09K 19/2021* (2013.01); *C09K 19/3458* (2013.01); *G02F 1/141* (2013.01); *C09K 2019/0437* (2013.01); *C09K 2019/2042* (2013.01); *G02F 2001/133726* (2013.01)

(58) Field of Classification Search
CPC .............. G02F 1/141; G02F 1/133788; G02F 2001/133726; C09K 19/0225; C09K 19/2021; C09K 19/3458; C09K 2019/0437; C09K 2019/2042
USPC .............. 349/41, 43, 123, 125, 127, 182, 183
See application file for complete search history.

(56) References Cited

U.S. PATENT DOCUMENTS

| | | | |
|---|---|---|---|
| 5,389,291 A | * | 2/1995 | Reiffenrath et al. ...... 252/299.61 |
| 6,351,301 B1 | | 2/2002 | Takatori |
| 7,304,705 B2 | * | 12/2007 | Sugimoto et al. ............. 349/141 |
| 2008/0084522 A1 | | 4/2008 | Lee et al. |
| 2010/0149446 A1 | | 6/2010 | Fujisawa et al. |

FOREIGN PATENT DOCUMENTS

| | | |
|---|---|---|
| JP | 2001-083496 A | 3/2001 |
| JP | 2010-175866 A | 8/2010 |
| KR | 1020010113172 A | 12/2001 |
| KR | 1020020021533 A | 3/2002 |
| KR | 1020020027050 A | 4/2002 |
| KR | 1020020042929 A | 6/2002 |
| KR | 1020040053429 A | 6/2004 |
| KR | 1020040061425 A | 7/2004 |
| KR | 1020100113282 A | 10/2010 |

OTHER PUBLICATIONS

Toru narata et al., "EO Characteristics of Polymer Stabilized Vertically Aligned (PSVA)-FLC Cell Using FLC Materials with/without SmA Phase", SID, IDW'09 The 16th International Display Workshops, World Convention Center Summit Miyazaki, Japan, Dec. 9(Wed)-11(Fri), 2009, LCT p. 6-4, pp. 151-154.

\* cited by examiner

*Primary Examiner* — Geraldina Visconti
(74) *Attorney, Agent, or Firm* — Innovation Counsel LLP

(57) ABSTRACT

A liquid crystal display device includes a first substrate having a first alignment base layer disposed thereon, a second substrate facing the first substrate and having a second alignment base layer disposed thereon, and ferroelectric liquid crystals vertically aligned between the first substrate and the second substrate. The first alignment controller combines with the first alignment base layer and includes a side chain longer than that of the first alignment base layer. The second alignment controller combines with the second alignment base layer and includes a side chain longer than that of the second alignment base layer. The ferroelectric liquid crystals are pre-tilted by the first alignment controller and the second alignment controller, and as a result, transmittance may be improved. Because the ferroelectric liquid crystals are pre-tilted, a cell gap may be decreased and high-speed driving may be possible at a low voltage.

18 Claims, 18 Drawing Sheets

[OFF]

[ON]

LIQUID CRYSTAL DISPLAY DEVICE AND METHODS FOR MANUFACTURING THE SAME

CROSS-REFERENCE TO RELATED APPLICATIONS

This U.S. non-provisional patent application claims priority under 35 U.S.C. §119 of Korean Patent Application No. 10-2012-0038674, filed on Apr. 13, 2012, the entire contents of which are hereby incorporated by reference.

BACKGROUND

The present disclosure herein relates to a liquid crystal display device and methods for manufacturing the same, and more particularly, to a ferroelectric liquid crystal display device and methods for manufacturing the same.

In general, liquid crystal display devices use an electro-optical effect of liquid crystals. The liquid crystal display devices include a pair of substrates and liquid crystals disposed between the pair of substrates. A pair of polarizer plates is attached to external surfaces of the pair of substrates.

The liquid crystal display devices are classified as a twisted nematic mode, an in-plane switching mode, a vertical alignment mode, and a ferroelectric mode according to the type of liquid crystals and the alignment method of the liquid crystal layer.

A ferroelectric liquid crystal display device includes ferroelectric liquid crystals. The ferroelectric liquid crystals have a short response time due to a polar interaction between the polarization moment and the electric field.

However, because the ferroelectric liquid crystals are sensitive to the surface characteristics of the pair of substrates, the alignment state of the ferroelectric liquid crystals is unstable. When the alignment of the ferroelectric liquid crystals is unstable, a contrast ratio of the ferroelectric liquid crystal display device may decrease. Also, the ferroelectric liquid crystal display device has a lower transmittance than those of other mode liquid crystal display devices.

SUMMARY

The present disclosure provides a liquid crystal display device including stably aligned ferroelectric liquid crystals and having improved transmittance.

The present disclosure also provides a method for manufacturing the liquid crystal display device.

A liquid crystal display devices includes a first substrate including a pixel; a second substrate facing the first substrate; and a liquid crystal layer disposed between the first substrate and the second substrate.

A first alignment layer may be disposed on the first substrate. The first alignment layer may include a first alignment base layer and a first alignment controller combined with the first alignment base layer and including a side chain longer than that of the first alignment base layer. Also, a second alignment layer may be disposed on the second substrate. The second alignment layer may include a second alignment base layer and a second alignment controller combined with the second alignment base layer and including a side chain longer than that of the second alignment base layer.

The liquid crystal layer may include ferroelectric liquid crystals arranged in a spiral shape and vertically aligned. The liquid crystal layer may include about 60 to 80 parts by weight of a first liquid crystal, the first liquid crystal including at least one selected from the group consisting of the following Chemical Formula 1; and about 20 to 40 parts by weight of a second liquid crystal expressed by the following Chemical Formula 2. Where, in the following Chemical Formula 1, $R_1$ and $R_2$ are alkyl groups having a carbon count of about 5 to about 10, respectively.

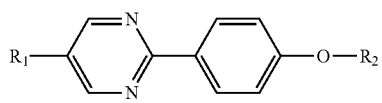

[Chemical Formula 1]

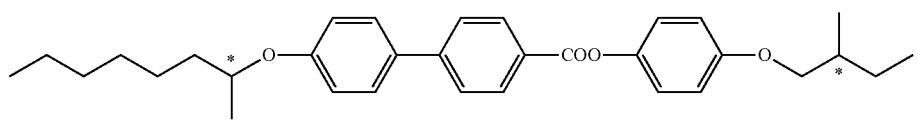

[Chemical Formula 2]

The first alignment base layer may include a first rubbing axis in a first direction and the second alignment base layer may include a second rubbing axis in a second direction opposite to the first direction.

An angle between liquid crystals pre-tilted by at least one of the first alignment controller and the second alignment controller and a rotation axis of the spiral shape may be in a range of about 35 degrees to about 40 degrees.

The first alignment controller and the second alignment controller may be photopolymerized reactive mesogens. The first alignment base layer and the second alignment base layer may include a vertical alignment material.

In another aspect, methods of manufacturing a liquid crystal display device include: forming a first alignment base layer on a first substrate including a pixel; forming a second alignment base layer on a second substrate; bonding the first substrate and the second substrate having a liquid crystal layer including alignment controlling materials and ferroelectric liquid crystals disposed therebetween; forming an electric field in the liquid crystal layer by applying a voltage to the pixel; and irradiating the liquid crystal layer with light to photopolymerize the alignment controlling materials.

A portion of the photopolymerized alignment controlling materials may combine with the first alignment base layer to form a first alignment controller and another portion of the photopolymerized alignment controlling materials may combine with the second alignment base layer to form a second alignment controller.

In another aspect, methods of manufacturing a liquid crystal display device include: forming a first alignment base layer including a first alignment controlling material on a first substrate including a pixel; forming a second alignment base layer including a second alignment controlling material on a second substrate; bonding the first substrate and the second substrate having a liquid crystal layer including ferroelectric liquid crystals disposed therebetween; forming an electric field in the liquid crystal layer by applying a voltage to the pixel; and irradiating the liquid crystal layer with light to photopolymerize the first alignment controlling material and the second alignment controlling material.

The ferroelectric liquid crystals may be in a nematic phase during the forming of the electric field in the liquid crystal layer and the irradiating of the liquid crystal layer with light.

BRIEF DESCRIPTION OF THE DRAWINGS

The accompanying drawings are included to provide a further understanding of the inventive concept, and are incorporated in and constitute a part of this specification. The drawings illustrate exemplary embodiments and, together with the description, serve to explain principles of the inventive concept. In the drawings.

DETAILED DESCRIPTION OF THE EMBODIMENTS

Exemplary embodiments will be described below in more detail with reference to the accompanying drawings. The inventive concept may, however, be embodied in different forms and should not be construed as limited to the embodiments set forth herein.

Hereinafter, exemplary embodiments will be described in more detail with reference to the accompanying drawings.

Figure 1:
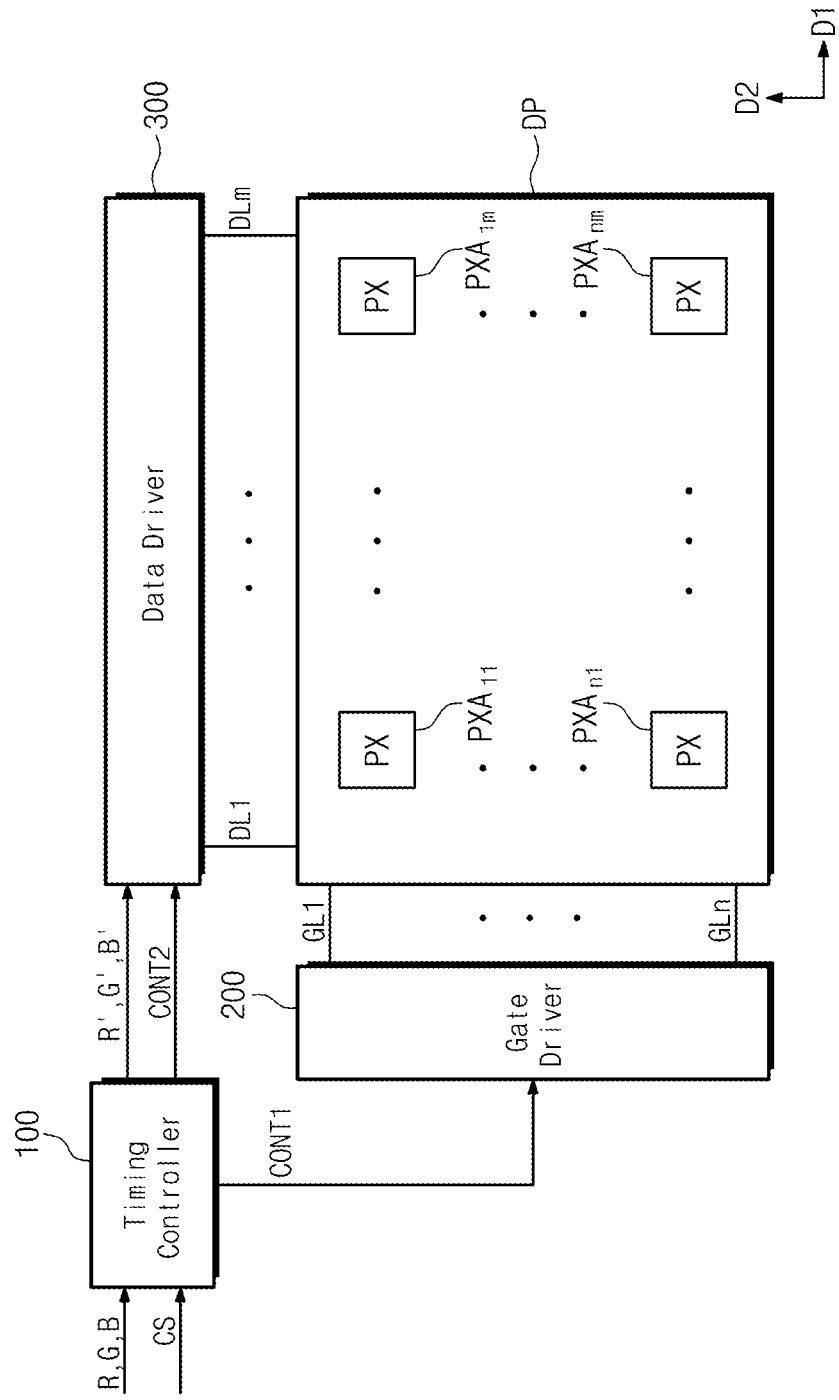
FIG. 1 is a block diagram of a liquid crystal display device according to an embodiment.
Figure 2:
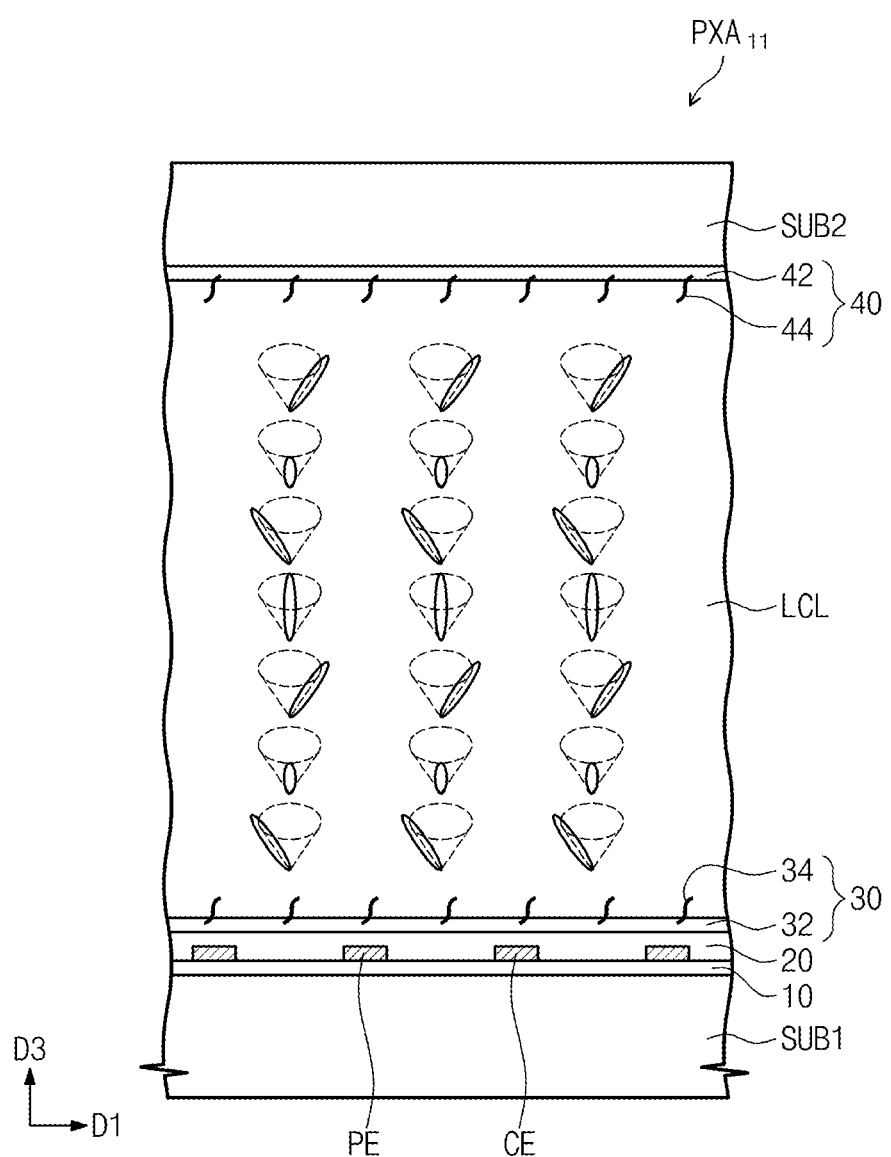
FIG. 2 is a cross-sectional view illustrating a pixel region shown in FIG. 1.

FIG. 1 is a block diagram of a liquid crystal display device according to an exemplary embodiment of the inventive concept and FIG. 2 is a cross-sectional view illustrating a pixel region shown in FIG. 1. Cross sections of the pixel regions $PXA_{11}$ to $PX_{nm}$ shown in FIG. 1 are the same as that of the pixel region $PXA_{11}$ shown in FIG. 2.

As shown in FIG. 1, the liquid crystal display device according to an exemplary embodiment includes a timing controller 100, a gate driver 200, a data driver 300, and a display panel DP.

The timing controller 100 receives input image signals R, G, and B and transforms the input image signals R, G, and B into image data R', G', and B' in accordance with operating conditions of the display panel DP. Also, the timing controller 100 receives various control signals CS, e.g., a vertical synchronizing signal, a horizontal synchronizing signal, a main clock, a data enable signal, and outputs first and second control signals CONT1 and CONT2.

The gate driver 200 outputs gate signals to gate lines $GL_1$ to $GL_n$ in response to the first control signal CONT1. The first control signal CONT1 includes a vertical start signal initiating an operation of the gate driver 200, a gate clock signal determining a gate voltage output timing, and an output enable signal determining an on pulse width of the gate voltage.

The data driver 300 receives the second control signal CONT2 and the image data R', G', and B'. The second control signal CONT2 includes a horizontal start signal initiating an operation of the data driver 300, a reversal signal reversing polarity of a data voltage, and an output request signal determining a data voltage output timing from the data driver 300. The data driver 300 transforms the image data R', G', and B' into data voltages to output to data lines $DL_1$ to $DL_m$.

The display panel DP includes a plurality of pixel regions $PXA_{11}$ to $PXA_{nm}$. The respective pixel regions $PXA_{11}$ to $PXA_{nm}$ include a pixel PX. The pixel PX is electrically connected to one of the gate lines $GL_1$ to $GL_n$ and one of the data lines $DL_1$ to $DL_m$.

Although not shown in the drawings, the liquid crystal display device according to the exemplary embodiment includes a first polarizer plate and a second polarizer plate disposed at both sides of the display panel DP. A transmission axis of the first polarizer plate and a transmission axis of the second polarizer plate are substantially orthogonal to each other. When light provided from a back light is directed through the plurality of pixel regions $PXA_{11}$ to $PXA_{nm}$, the plurality of pixel regions $PXA_{11}$ to $PXA_{nm}$ are selectively on or off. As a result, the display panel DP generates an image.

As shown in FIG. 2, the display panel DP includes a first substrate SUB1, a second substrate SUB2 facing the first substrate SUB1, and a liquid crystal layer LCL disposed between the first substrate SUB1 and the second substrate SUB2.

The liquid crystal layer LCL includes ferroelectric liquid crystals. The ferroelectric liquid crystals have a chiral smectic C phase during a phase transition process that depends on temperature.

The liquid crystal layer LCL may include a first liquid crystal, which is at least any one selected from the group consisting of the following Chemical Formula 1, and a second liquid crystal, which is at least any one selected from the group consisting of the following Chemical Formula 2. The second liquid crystal has a chiral component.

[Chemical Formula 1]

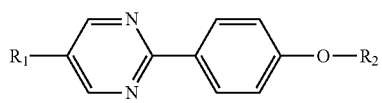

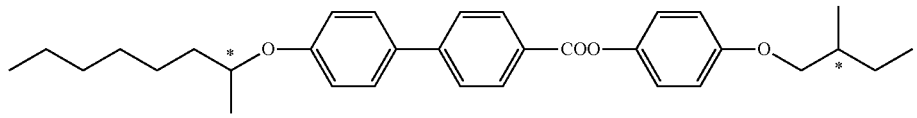

[Chemical Formula 2]

In the liquid crystal layer LCL, the concentration of the second liquid crystal in the liquid crystal layer LCL is based on the concentration of the first liquid crystal. Thus, about 20 to 40 parts by weight of the second liquid crystal are included based on about 80 to 60 parts by weight of the first liquid crystal. In Chemical Formula 1, $R_1$ and $R_2$ are alkyl groups having a carbon count of about 5 to about 10, respectively (i.e. the alkyl groups can include about 5 to about 10 carbons).

An isotropic phase-nematic phase transition temperature of the liquid crystal layer LCL including the first liquid crystal and the second liquid crystal is about 70.5° C., a nematic phase-smectic A phase transition temperature is about 63.3° C., and a smectic A phase-chiral smectic phase transition temperature is about 60.7° C. A cone angle of the ferroelectric liquid crystals including the first liquid crystal and the second liquid crystal is about 56 degrees and an apparent cone angle is about 15 degrees or less. Also, a polarization moment is about 25 nC/cm² and a pitch is about 1.5 μm.

A first electrode PE and a second electrode CE are disposed on a first insulation layer 10 disposed on the first substrate SUB1. The first electrode PE and the second electrode CE receive voltages having different levels. As a result, a horizontal electric field is formed between the first electrode PE and the second electrode CE. In the present embodiment, the first electrode PE is denoted as a pixel electrode receiving a pixel voltage and the second electrode CE is denoted as a common electrode receiving a reference voltage.

A second insulation layer 20 covering the pixel electrode PE and the common electrode CE is disposed on the first insulation layer 10. Although not shown in detail in FIG. 2, each of the first insulation layer 10 and the second insulation layer 20 may be composed of a plurality of thin films.

A first alignment layer 30 is disposed on the second insulation layer 20. The first alignment layer 30 includes a first alignment base layer 32 and a first alignment controller 34 combined with the first alignment base layer 32. The first alignment controller 34 may form a first alignment controlling layer.

The first alignment base layer 32 may include a vertical alignment material having a side chain (hereinafter, referred to as "first side chain" (not shown)) formed of hydrocarbons. Also, the first alignment base layer 32 may include a photoalignment material. The photoalignment material may be classified as a photolysis material, a photoisomerization material, a photocurable material, or a photopolymerization material according to the type of reactions it undergoes with light.

The first alignment base layer 32 may have a first rubbing axis. The first rubbing axis is defined as an imaginary axis along which the first alignment base layer 32 is rubbed in a first direction D1. The first side chain of the first alignment base layer 32 may be pre-tilted, i.e. oriented at a predetermined angle with respect to the substrate when no electric field is applied, in the first direction D1.

The first alignment controller 34 includes a reactive mesogen. The reactive mesogen denotes a polymerizable mesogenic compound. A "mesogenic compound" or "mesogenic material" includes one or more rod-shaped, plate-shaped, or disc-shaped mesogenic functional groups, i.e., a material or compound including a functional group that induces a liquid crystal phase behavior.

The first alignment controller 34 combines with the first alignment base layer 32 to form another side chain (hereinafter, referred to as "second side chain") of the first alignment base layer 32. The first alignment controller 34 may be combined with the first alignment base layer 32 by, for example, being photopolymerized with ultraviolet (UV) light.

The second side chain formed with the first alignment controller 34 is longer than the first side chain of the first alignment base layer 32. Also, the second side chain has a predetermined angle with respect to the first substrate SUB1. The second side chain may pre-tilt liquid crystals that are adjacent to the first substrate SUB1 among the ferroelectric liquid crystals.

A second alignment layer 40 is disposed on the second substrate SUB2. The second alignment layer 40 includes a second alignment base layer 42 and a second alignment controller 44 combined with the second alignment base layer 42. The second alignment controller 44 may form a second alignment controlling layer.

The second alignment base layer 42 and the second alignment controller 44 are formed of the same materials as those of the first alignment base layer 32 and the first alignment controller 34, respectively. The second alignment base layer 42 also has a side chain (hereinafter, referred to as "third side chain" (not shown)).

The second alignment base layer 42 may have a second rubbing axis that is different from the first rubbing axis. The second rubbing axis may, for example, be an imaginary axis that is defined as the rubbing direction of the second alignment base layer, which is a second direction opposite to the direction D1 of first rubbing axis (e.g., the second direction is from the right hand side to the left hand side, whereas the first direction D1 is from the left hand side to the right hand side).

The second alignment controller 44 combines with the second alignment base layer 42 to form another side chain (hereinafter, referred to as "fourth side chain") of the second alignment base layer 42. The fourth side chain formed of the second alignment controller 44 may pre-tilt liquid crystals that are adjacent to the second substrate SUB2 among the ferroelectric liquid crystals.

A color filter may be disposed on the second substrate SUB2. The color filter may be disposed between one surface of the second substrate SUB2 and the second alignment base layer 42. Also, the pixel regions $PXA_{11}$ to $PXA_{nm}$ (see FIG. 1) may be divided into portions such that a portion of the pixel regions PXA1 to PXAnm have a red color filter, another portion has a green color filter, and a remaining portion has a blue color filter.

Figure 3A:
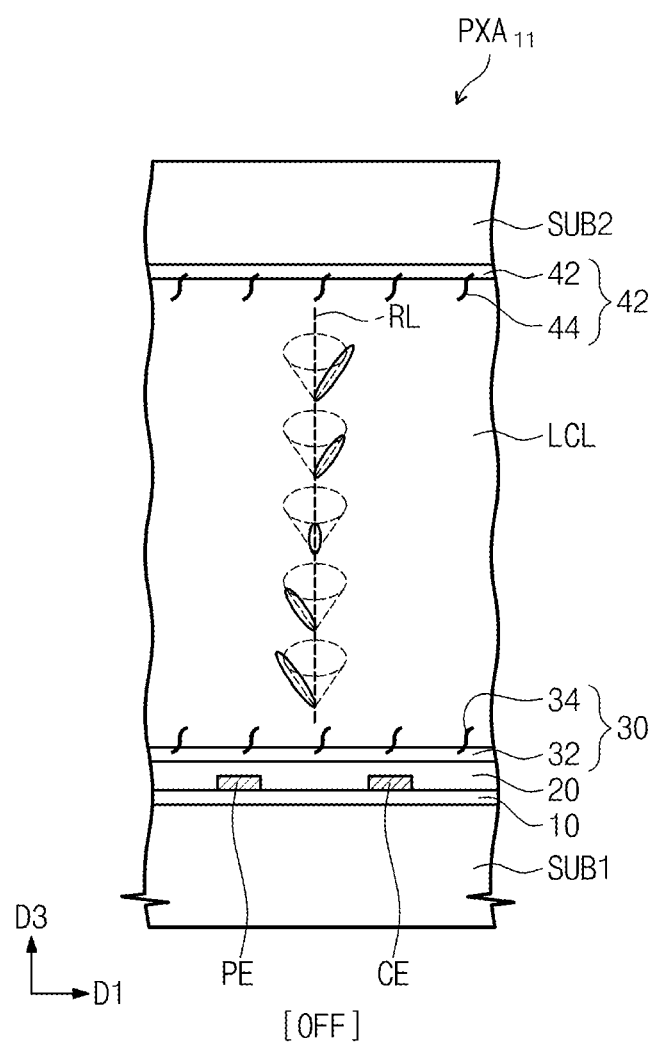
FIGS. 3A and 3B illustrate alignments of ferroelectric liquid crystals changed according to an electric field.
Figure 3B:
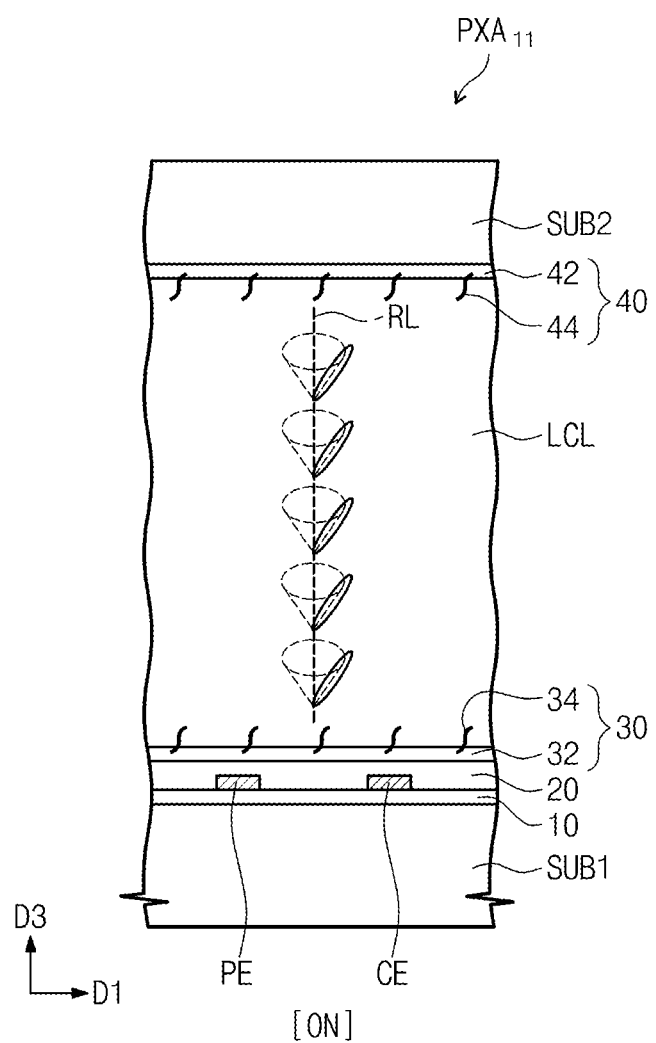

FIGS. 3A and 3B illustrate alignments of ferroelectric liquid crystals being changed by an electric field applied between PE and CE. The ferroelectric liquid crystals disposed between the first substrate SUB1 and the second substrate SUB2 are oriented between the first alignment layer 30 and the second alignment layer 40 so as to form a spiral shape, and are vertically aligned. A group of the ferroelectric liquid crystals forming a single spiral and completing a 360 degrees rotation form a single pitch. FIGS. 3A and 3B illustrate ferroelectric liquid crystals corresponding to a half-pitch of the spiral shape.

As shown in FIG. 3A, when no electric field is applied, the ferroelectric liquid crystals continuously rotate along a circular cone while rotating layer by layer to form a spiral shape. When the ferroelectric liquid crystals form the spiral shape, the pixel region $PXA_{11}$ transmits a low-gradation image. Because vertically aligned ferroelectric liquid crystals are more stable than horizontally aligned ferroelectric liquid crystals with no applied field, the vertically aligned ferroelectric liquid crystals may transmit a low-gradation image that is close to black.

As shown in FIG. 3B, when the electric field is applied between PE and CE, the spiral pattern of ferroelectric liquid crystals is untwisted by the polar interaction between each crystal's polarization moment and the applied electrical field. The ferroelectric liquid crystals tilt at a predetermined angle with respect to a rotation axis RL of the spiral shape. As a result, light passing through the liquid crystal layer LCL is scattered and the pixel region $PXA_{11}$ indicates a high-gradation image.

The first alignment controller 34 increases a tilt angle of the liquid crystals adjacent to the first substrate SUB1 with respect to the rotation axis RL and the second alignment controller 44 increases a tilt angle of the liquid crystals adjacent to the second substrate SUB2 with respect to the rotation axis RL. Therefore, a cone angle of the ferroelectric liquid crystals is increased and transmittance of the pixel PX is improved.

Figure 4A:
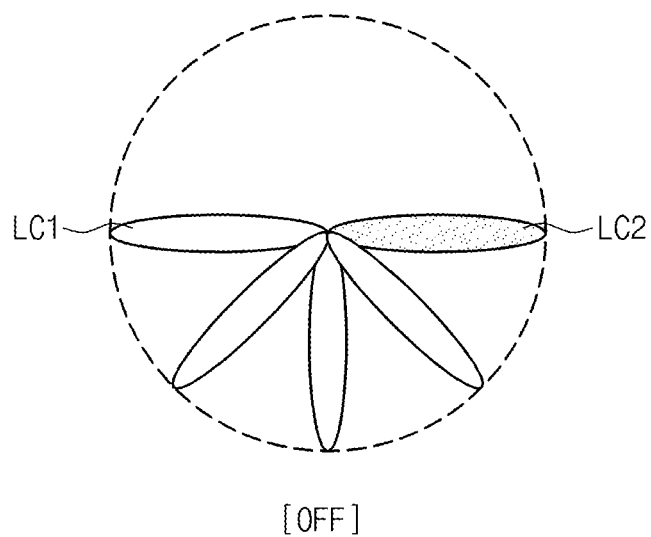
FIGS. 4A and 4B are plan views of the ferroelectric liquid crystals shown in FIGS. 3A and 3B taken from a screw axis RL.
Figure 4B:
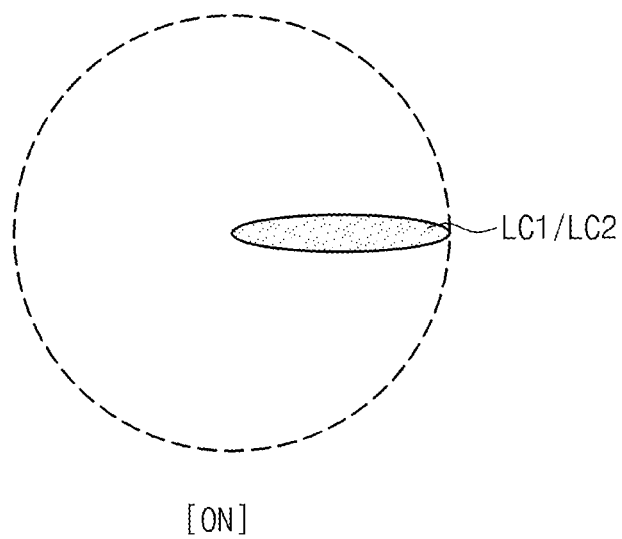
Figure 4C:
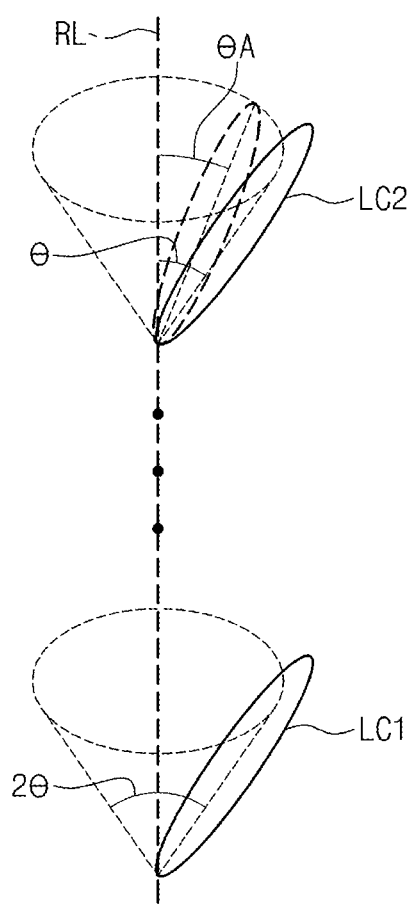
FIG. 4C illustrates cone angles of some liquid crystals of the ferroelectric liquid crystals shown in FIG. 3B.

The embodiment of the inventive concept will be described in more detail with reference to FIGS. 4A through 4C. FIGS. 4A and 4B are plan views of the ferroelectric liquid crystals shown in FIGS. 3A and 3B looking down the screw (rotation) axis RL. FIG. 4C illustrates cone angles of some liquid crystals of the ferroelectric liquid crystals shown in FIG. 3B.

A first ferroelectric liquid crystal LC1 shown in FIGS. 4A through 4C is a liquid crystal adjacent to the first alignment layer 30 (see FIGS. 3A and 3B) and a second ferroelectric liquid crystal LC2 is a liquid crystal adjacent to the second alignment layer 40 (see FIGS. 3A and 3B).

As shown in FIG. 4A, when no electric field is applied, an angle between the first ferroelectric liquid crystal LC1 and the second ferroelectric liquid crystal LC2 is about 180 degrees in plain view. As shown in FIG. 4B, when an electric field is applied, the angle between the first ferroelectric liquid crystal LC1 and the second ferroelectric liquid crystal LC2 is about zero degree in plain view.

As shown in FIG. 4C, when the electric field is applied, the first ferroelectric liquid crystal LC1 and the second ferroelectric liquid crystal LC2 are tilted with respect to the rotation axis RL. The angle θ between the first ferroelectric liquid crystal LC1 or the second ferroelectric liquid crystal LC2 and the rotational axis RL is in a range of about 35 degrees to about 40 degrees. Herein, twice the angle θ is defined as a cone angle 2θ. Thus, the cone angle for the first ferroelectric liquid crystal LC1 and the second ferroelectric liquid crystal LC2 shown in FIG. 4C is 70 degrees to about 80 degrees.

An inherent cone angle of the ferroelectric liquid crystals including liquid crystals of Chemical Formulas 1 and 2 is about 56 degrees, in contrast, the ferroelectric liquid crystals in the liquid crystal layer LCL are pre-tilted by the first alignment controller and the second alignment controller so as to have a cone angle the range of about 70 degrees to about 80 degrees, which is greater than about 56 degrees. As a result, transmittance of the pixel PX is improved.

When the liquid crystal display device is operated, the first ferroelectric liquid crystal LC1 and the second ferroelectric liquid crystal LC2 form an apparent cone angle $\theta_A$ with respect to the rotation axis RL. The apparent cone angle $\theta_A$ is less than the angle θ. The apparent cone angle $\theta_A$ in the present embodiment is in a range of about 20 degrees to about 25 degrees. That is, the liquid crystal display device according to the present embodiment includes the first alignment controller 34 and the second alignment controller 44, and thus, has an apparent cone angle $\theta_A$ that is greater than an inherent apparent cone angle of the liquid crystal layer LCL including the liquid crystals of Chemical Formulas 1 and 2.

A refractive index of the liquid crystal layer LCL is determined by multiplying a birefringence and a cell gap. An orthogonally projected value of the apparent cone angle $\theta_A$ determines the birefringence of the liquid crystal layer LCL. When the apparent cone angle $\theta_A$ is increased as described above, the same refractive index may be obtained by a small cell gap.

In the case that the cone angle 2θ is increased to a range of about 70 degrees to about 80 degrees from about 56 degrees, the cell gap of the display panel decreases in a range of about 40% to about 75% in comparison to that of the existing display panel when the apparent cone angle $\theta_A$ is increased from a range of about 10 degrees to 15 degrees to a range of about 20 degrees to 25 degrees. Herein, the cell gap is defined as a distance between the first alignment layer 30 and the second alignment layer 40. Because the cell gap can be decreased, an electric field may be formed in the liquid crystal layer LCL at a low driving voltage. As a result, power consumption is decreased and high-speed driving is possible.

Figure 5:
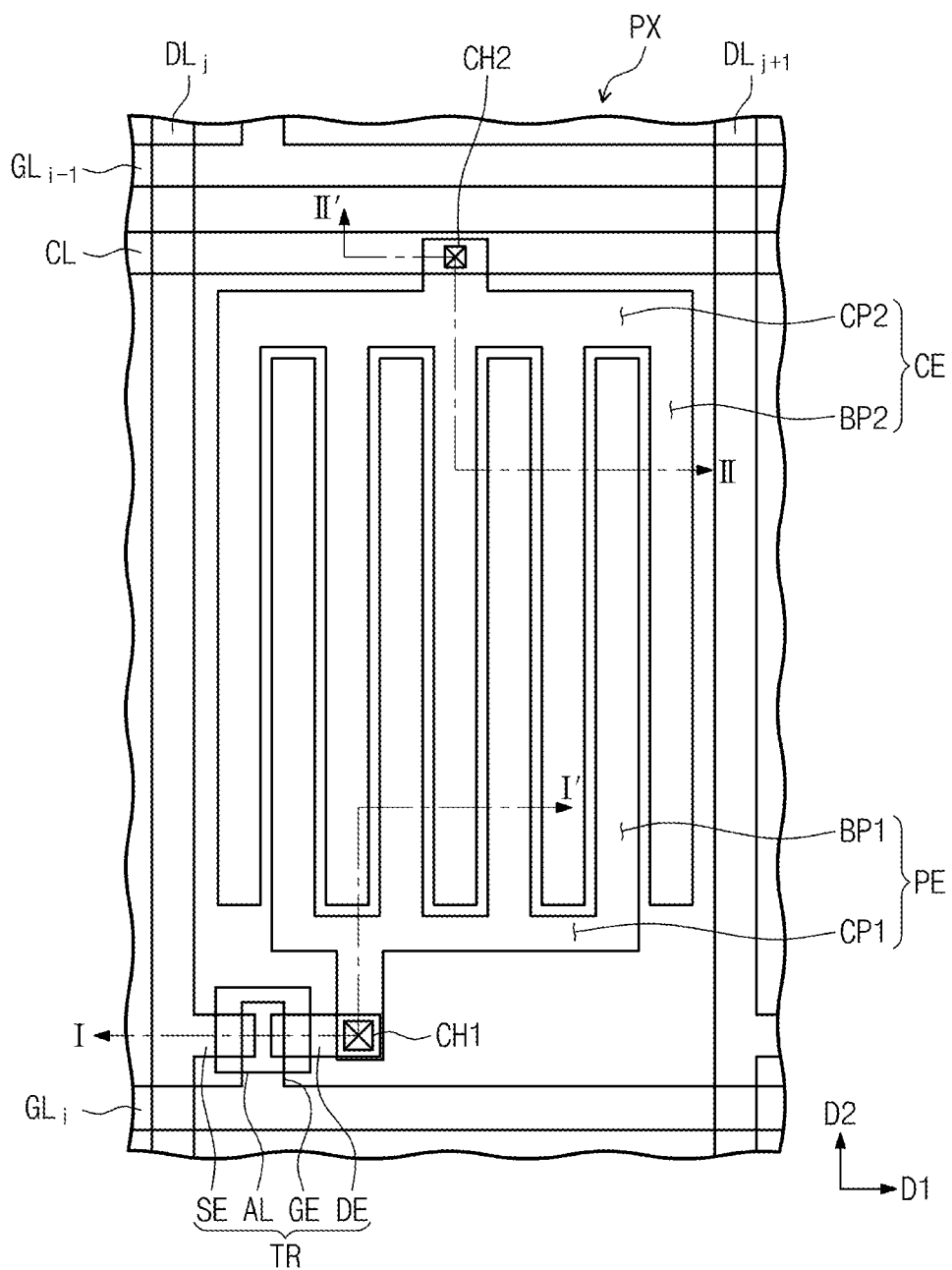
FIG. 5 is a plan view illustrating a pixel included in the pixel regions shown in FIG. 1.
Figure 6:
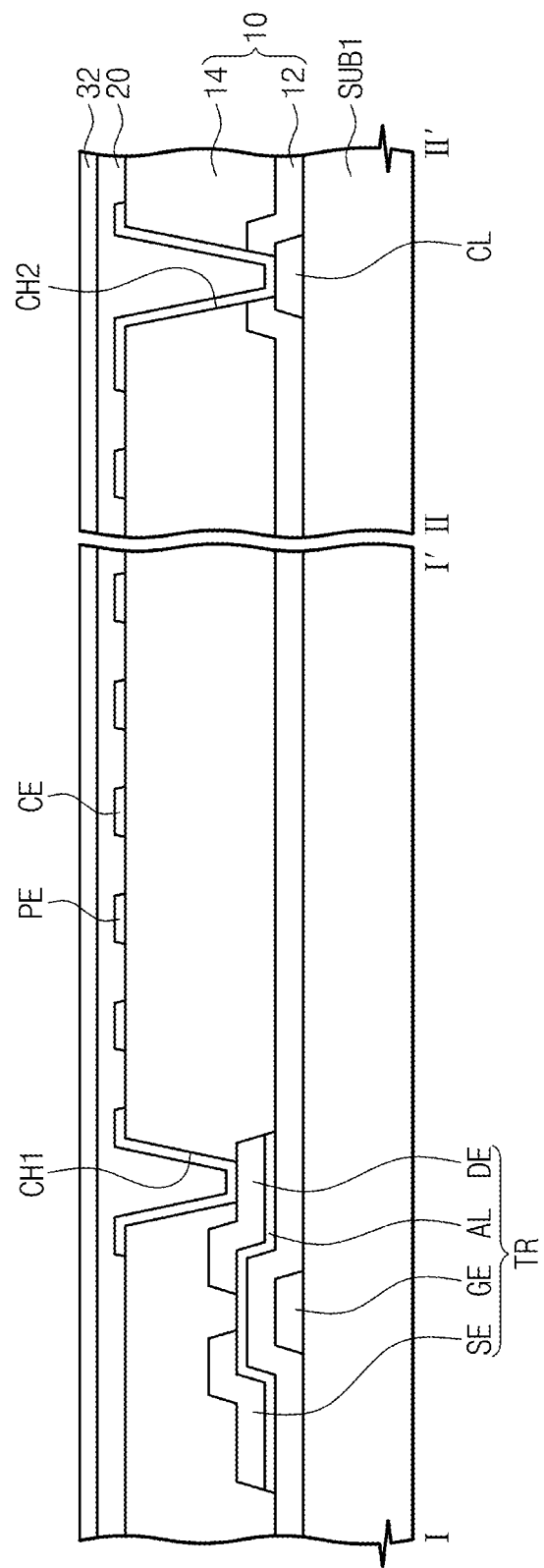
FIG. 6 is a cross-sectional view illustrating a portion of the pixel shown in FIG. 5.

FIG. 5 is a plan view illustrating a pixel included in the pixel regions PX shown in FIG. 1, and FIG. 6 is a cross-sectional view illustrating a portion of the pixel shown in FIG. 5. As shown in FIGS. 5 and 6, the pixel PX is disposed on the first substrate SUB1 and includes a thin film transistor TR, a pixel electrode PE, and a common electrode CE.

As shown in FIG. 5, the thin film transistor TR includes a gate electrode GE, a semiconductor layer AL, a source electrode SE, and a drain electrode DE.

The gate electrode GE is branched from a gate line $GL_i$ of the plurality of gate lines $GL_1$ to $GL_n$, and the source electrode SE is branched from a data line $DL_j$ of the plurality of data lines $DL_1$ to $DL_m$. The drain electrode DE is disposed so as to be spaced apart from the source electrode SE and connected to the pixel electrode PE.

The thin film transistor TR outputs a data voltage applied to the data line $DL_j$ to the pixel electrode PE in response to a gate signal applied to the gate line $GL_i$.

The pixel electrode PE includes a plurality of first branch portions BP1 and a first connecting portion CP1 connecting ends of the first branch portions BP1 along one side of the pixel PX. The first connecting portion CP1 is connected to the thin film transistor TR through a first contact hole CH1.

The common electrode CE includes a plurality of second branch portions BP2 and a second connecting portion CP2 connecting ends of the second branch portions BP2 that are along another side of the pixel PX. The second connecting portion CP2 is connected to the common line CL through a second contact hole CH2. The second branch portions BP2 are spaced apart from the first branch portions BP1 and alternatingly arranged.

The gate line $GL_i$ and the common line CL are respectively disposed under and above the pixel electrode PE positioned at the center in plain view. Also, the data line $DL_j$ and another data line $DL_{j+1}$ are respectively disposed on the left and right sides of the pixel electrode PE, so that the pixel electrode PE is positioned at the center in plain view.

As shown in FIG. 6, the gate electrode GE and the common line CL are disposed on one surface of the first substrate SUB1. A first insulation thin film 12 covers the gate electrode GE and the common line CL.

The semiconductor layer AL positioned above the gate electrode GE is disposed on the first insulation thin film 12. The drain electrode DE and the source electrode SE are disposed on the first insulation thin film 12. At least portions of the drain electrode DE and the source electrode SE are positioned above the semiconductor layer AL.

A second insulation thin film 14 covering the semiconductor layer AL, the drain electrode DE, and the source electrode SE is disposed on the first insulation thin film 12. The pixel electrode PE and the common electrode CE are disposed on the second insulation thin film 14. The pixel electrode PE is connected to the drain electrode DE through the first contact hole CH1 penetrating the second insulation thin film 14. The common electrode CE is connected to the common line CL through the second contact hole CH2 penetrating the second insulation thin film 14.

A third insulation thin film 20 (the second insulation layer in FIG. 2) covering the common electrode CE is disposed on the second insulation thin film 14. The first alignment base layer 32 is disposed on the third insulation thin film 20.

Figure 7:
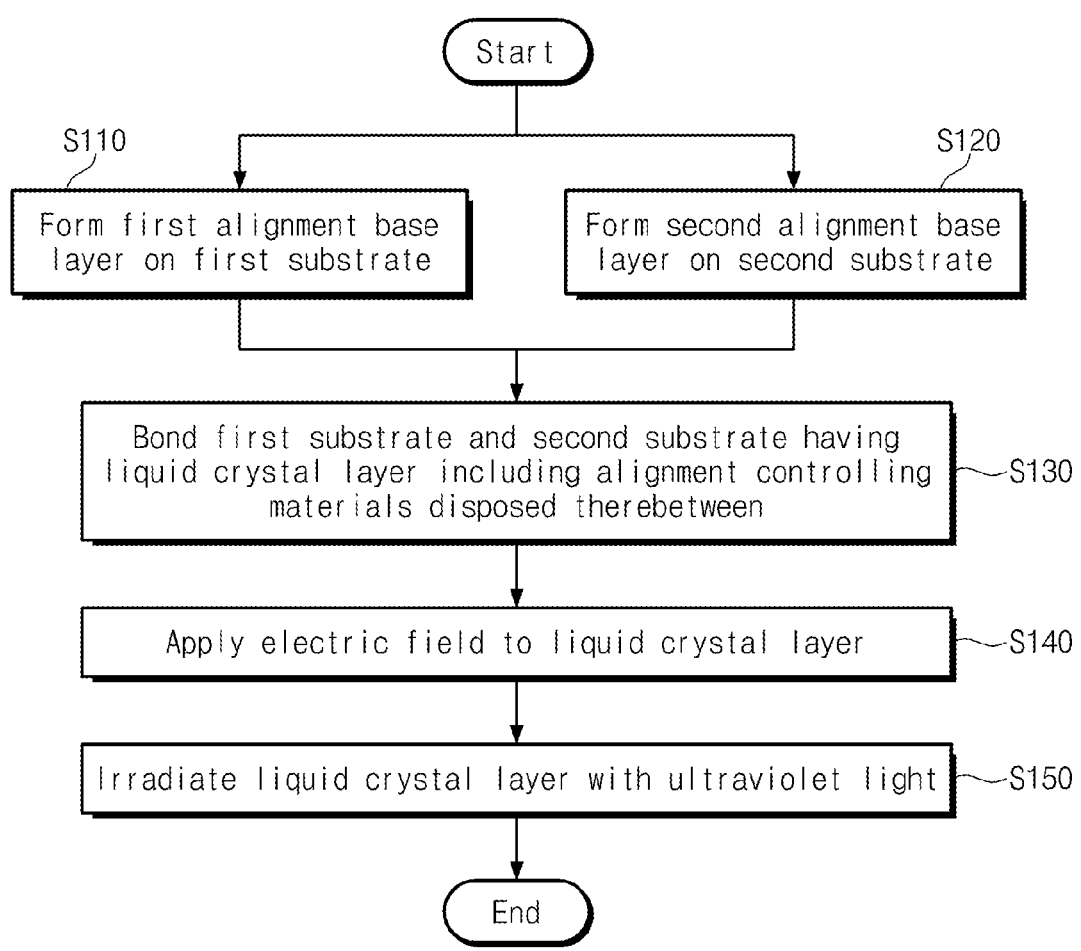
FIG. 7 is a flowchart illustrating a method for manufacturing a liquid crystal display device according to an embodiment.

FIG. 7 is a flowchart illustrating a method for manufacturing a liquid crystal display device according to an exemplary embodiment. FIGS. 8A through 8E are cross-sectional views according to the method for manufacturing a liquid crystal display device shown in FIG. 7. Hereinafter, the same reference numerals are provided for the same configurations as those described with reference to FIGS. 1 through 6.

Figure 8A:
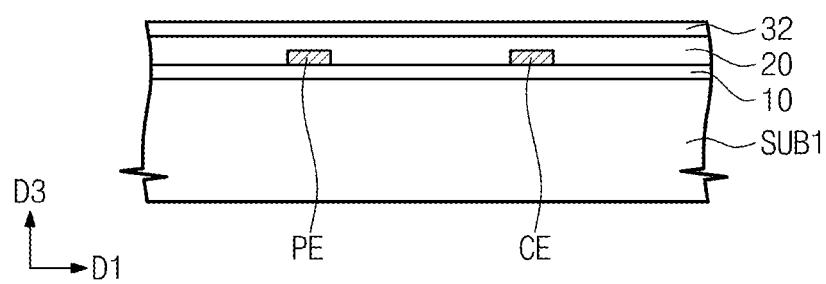
FIGS. 8A through 8E are cross-sectional views according to a method for manufacturing a liquid crystal display device as shown in FIG. 7.

First, a first alignment base layer 32 is formed on a first substrate SUB1 (S110). As shown in FIG. 8A, a third insulation thin film 20 is coated with a vertical alignment material by using a method such as inkjet or roll printing. The first alignment base layer 32 is formed and then the first alignment base layer 32 may be rubbed in a first direction D1.

Figure 8B:
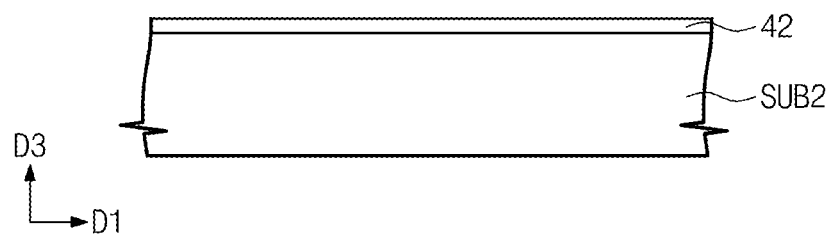

Also, a second alignment base layer 42 is formed on a second substrate SUB2 (S120). As shown in FIG. 8B, one surface of the second substrate SUB2 is coated with a vertical alignment material by using a method such as inkjet or roll printing. The second alignment base layer 42 is formed and then the second alignment base layer 42 may be rubbed in the first direction D1.

The process of forming the first alignment base layer 32 on the first substrate SUB1 and the process of forming the second alignment base layer 42 on the second substrate SUB2 may be performed independently. A sequence of the processes is not limited in the method for manufacturing a liquid crystal display device according to the present exemplary embodiment.

Figure 8C:
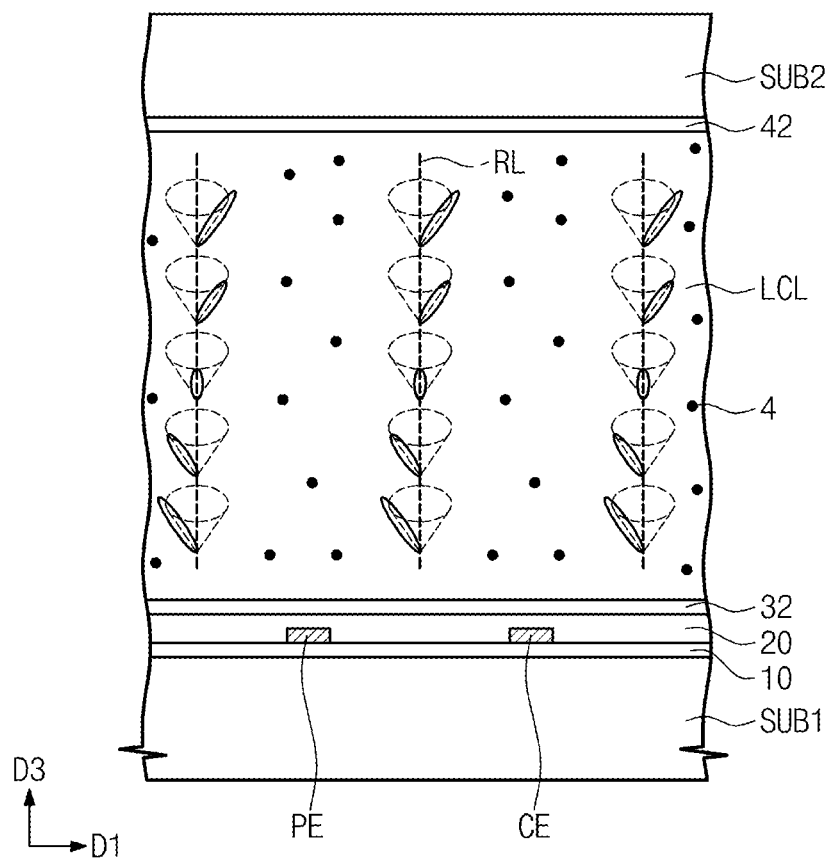

Next, the first substrate SUB1 and the second substrate SUB2 having a liquid crystal layer LCL including alignment controlling materials 4 disposed therebetween are bonded (S130). As shown in FIG. 8C, the liquid crystal layer LCL is sealed between the first substrate SUB1 and the second substrate SUB2 by using a sealant (not shown) disposed on edge regions of the first substrate SUB1 and the second substrate SUB2. Also, the sealant bonds the first substrate SUB1 and the second substrate SUB2.

Because the first substrate SUB1 and the second substrate SUB2 are oriented so that the alignment layers face each other and are then bonded, the first alignment base layer 32 and the second alignment base layer 42 have rubbing axes in that are in opposite directions to each other.

Figure 8D:
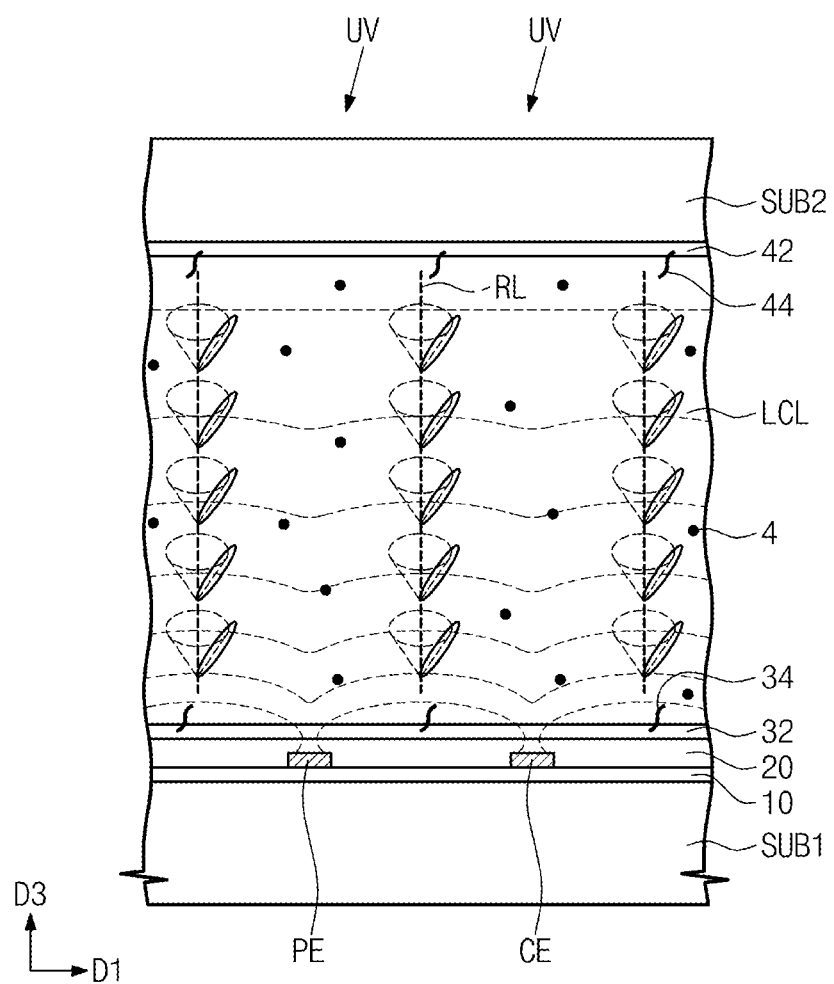

Next, an electric field is applied to the liquid crystal layer LCL (S140). A first level voltage is applied to the pixel electrode PE and a second level voltage lower than the first level voltage is applied to the common electrode CE. As shown in FIG. 8D, when the electric field is formed in the liquid crystal layer LCL, the spiral arrangement of ferroelectric liquid crystals is untwisted.

Thereafter, the liquid crystal layer LCL having the electric field formed therein is irradiated with ultraviolet (UV) light (S150). As shown in FIG. 8D, photopolymerization of the alignment controlling materials 4 is started.

Figure 8E:
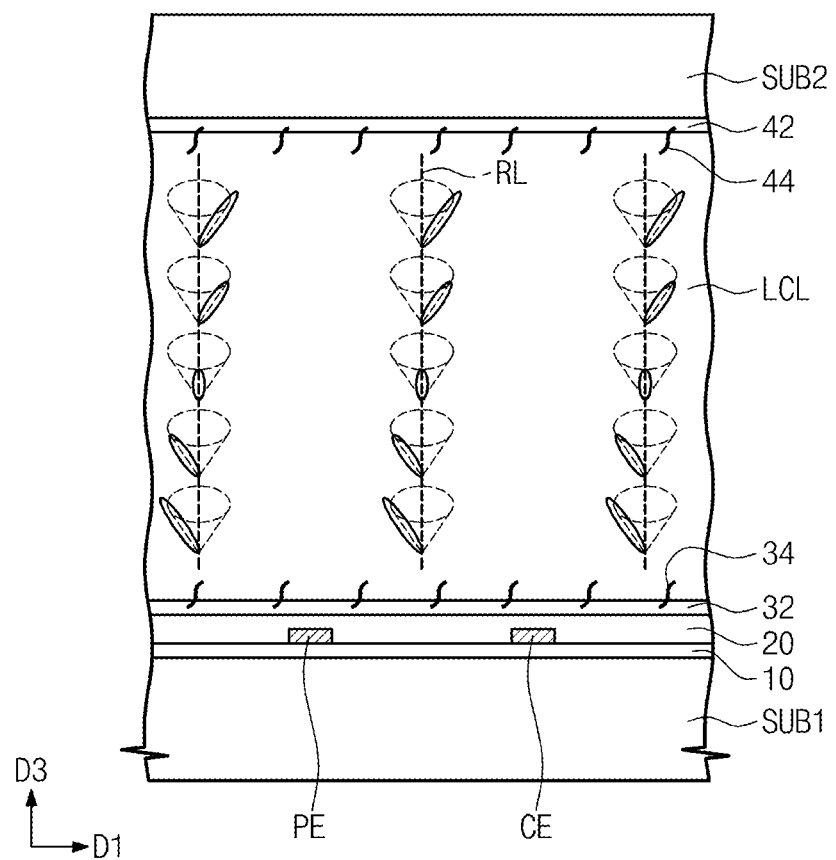

As shown in FIG. 8E, after the photopolymerization of the alignment controlling materials 4 is terminated, a portion of the alignment controlling materials 4 combines with the first alignment base layer 32 to form a first alignment controller 34. Another portion of the alignment controlling materials 4 combines with the second alignment base layer 42 to form a second alignment controller 44.

The first alignment controller 34 combined with the first alignment base layer 32 pre-tilts liquid crystals adjacent to the first substrate SUB1. The second alignment controller 44 combined with the second alignment base layer 42 pre-tilts liquid crystals adjacent to the second substrate SUB2.

When the electric field formed in the liquid crystal layer LCL is removed, the ferroelectric liquid crystals are rearranged by orienting into a spiral shape as shown in FIG. 8E.

In the present embodiment, when the electric field is formed in the liquid crystal layer LCL, the ferroelectric liquid crystals may be in a nematic phase. For example, with respect to manufacturing a liquid crystal display device including the foregoing first liquid crystal according to Chemical Formula 1 and second liquid crystal according to Chemical Formula 2, a process of applying the electric field to the liquid crystal layer LCL and a process of irradiating the liquid crystal layer LCL with UV light are performed within a temperature range of about 64° C. to about 70° C.

The ferroelectric liquid crystals change to an isotropic phase, a nematic phase, and a chiral smectic phase as the temperature changes from a high temperature to a low temperature. The ferroelectric liquid crystals that are in a nematic phase are more easily arranged in a specific direction in comparison to the ferroelectric liquid crystals having other phases. The phase transition temperature of the ferroelectric liquid crystals may vary slightly depending upon the type of components constituting the liquid crystal layer LCL and a compositional ratio of the components.

Therefore, because the ferroelectric liquid crystals are in the nematic phase after the electric field is formed in the liquid crystal layer LCL, the first ferroelectric liquid crystal LC1 (see FIG. 4C) and the second ferroelectric liquid crystal LC2 (see FIG. 4C) may be easily pre-tilted in directions induced by the first alignment controller 34 and the second alignment controller 44, respectively.

Figure 9:
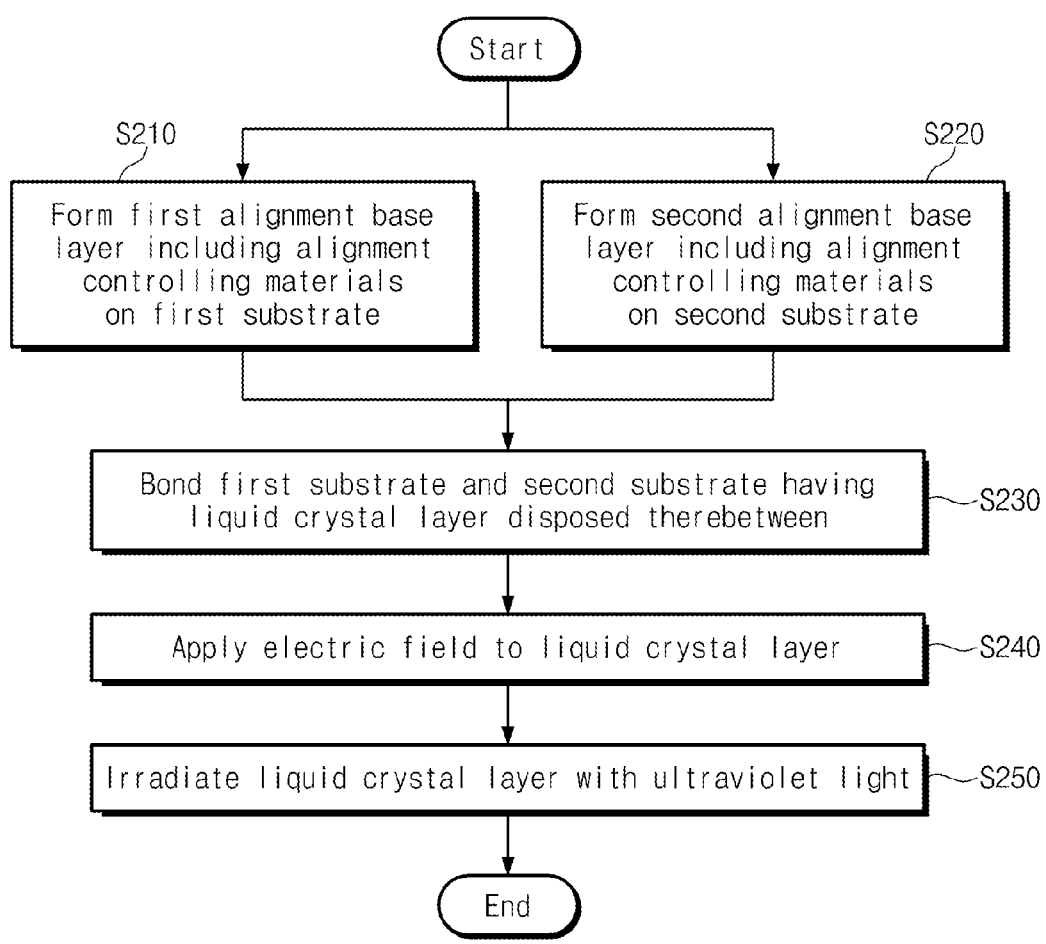
FIG. 9 is a flowchart illustrating a method for manufacturing a liquid crystal display device according to another embodiment.

FIG. 9 is a flowchart illustrating a method for manufacturing a liquid crystal display device according to another exemplary embodiment. FIGS. 10A through 10E are cross-sectional views according to the method for manufacturing a liquid crystal display device shown in FIG. 9. Hereinafter, the same reference numerals are provided for the same configurations as those described with reference to FIGS. 1 through 6.

A difference between the method for manufacturing a liquid crystal display device according to the present exemplary embodiment, and the manufacturing method described with reference to FIG. 7, is that the alignment controlling materials 3, 4 are included in the first alignment base layer 32 and the second alignment base layer 42, respectively, as opposed to the liquid crystal layer LCL.

Figure 10A:
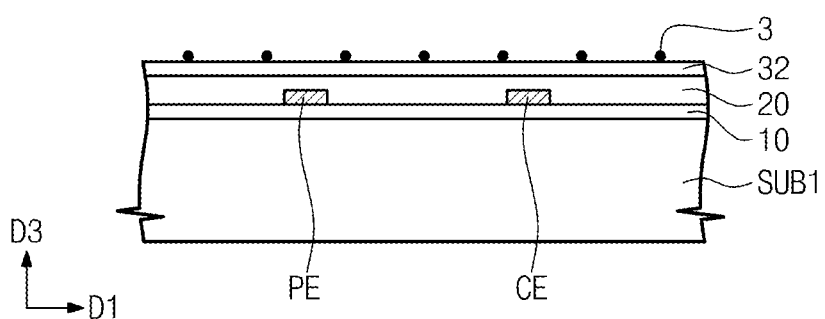
FIGS. 10A through 10E are cross-sectional views according to the method for manufacturing a liquid crystal display device shown in FIG. 9.

First, a first alignment base layer 32 including a first alignment controlling materials 3 is formed on a first substrate SUB1 (S210). As shown in FIG. 10A, a third insulation thin film 20 of the first substrate SUB1 is coated with a vertical alignment material including the first alignment controlling materials 3 by using a method such as inkjet or roll printing. The third insulation thin film 20 of the first substrate SUB1 is coated with the vertical alignment material and may then be recoated with the alignment controlling materials 3.

Figure 10B:
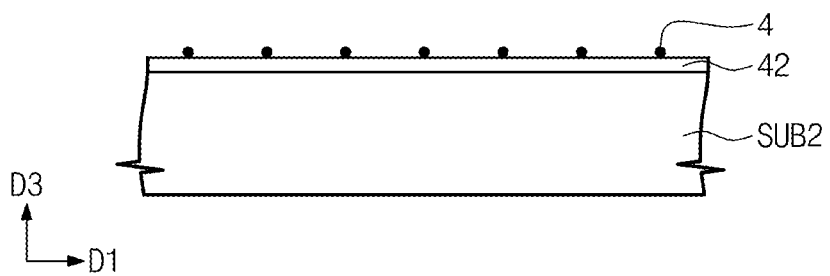

Also, a second alignment base layer 42 including a second alignment controlling materials 4 is formed on a second substrate SUB2 (S220). As shown in FIG. 10B, the second alignment controlling materials 4 is disposed on a surface of the second alignment base layer 42.

Figure 10C:
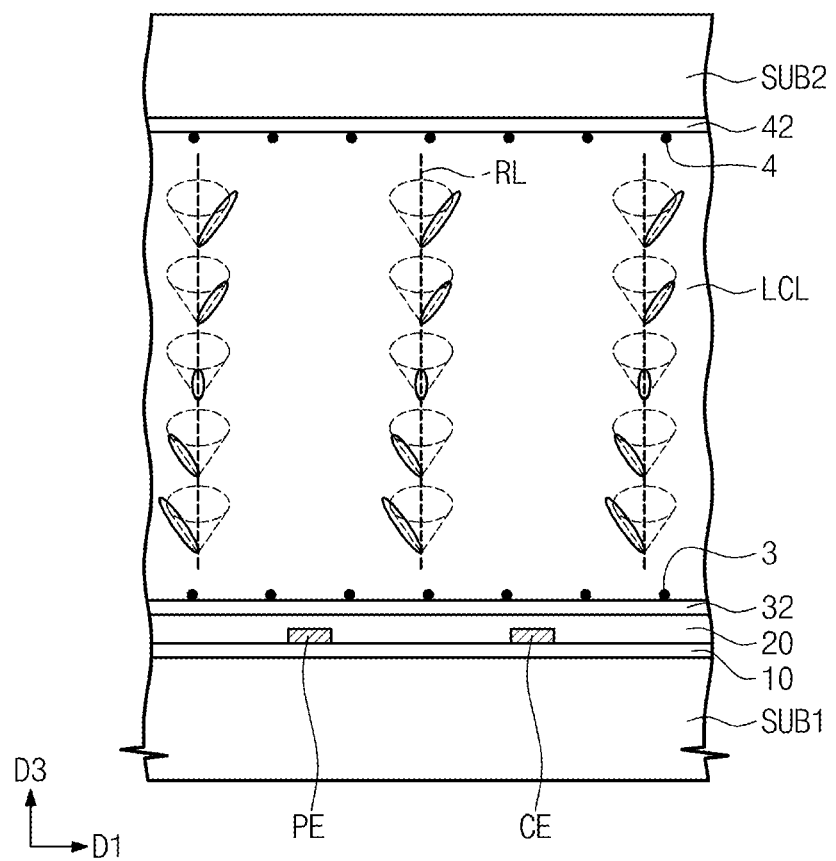

Next, the first substrate SUB1 and the second substrate SUB2 having a liquid crystal layer LCL disposed therebetween are bonded (S230). As shown in FIG. 10C, the first and second alignment controlling materials 3, 4 is exposed to the liquid crystal layer LCL.

Figure 10D:
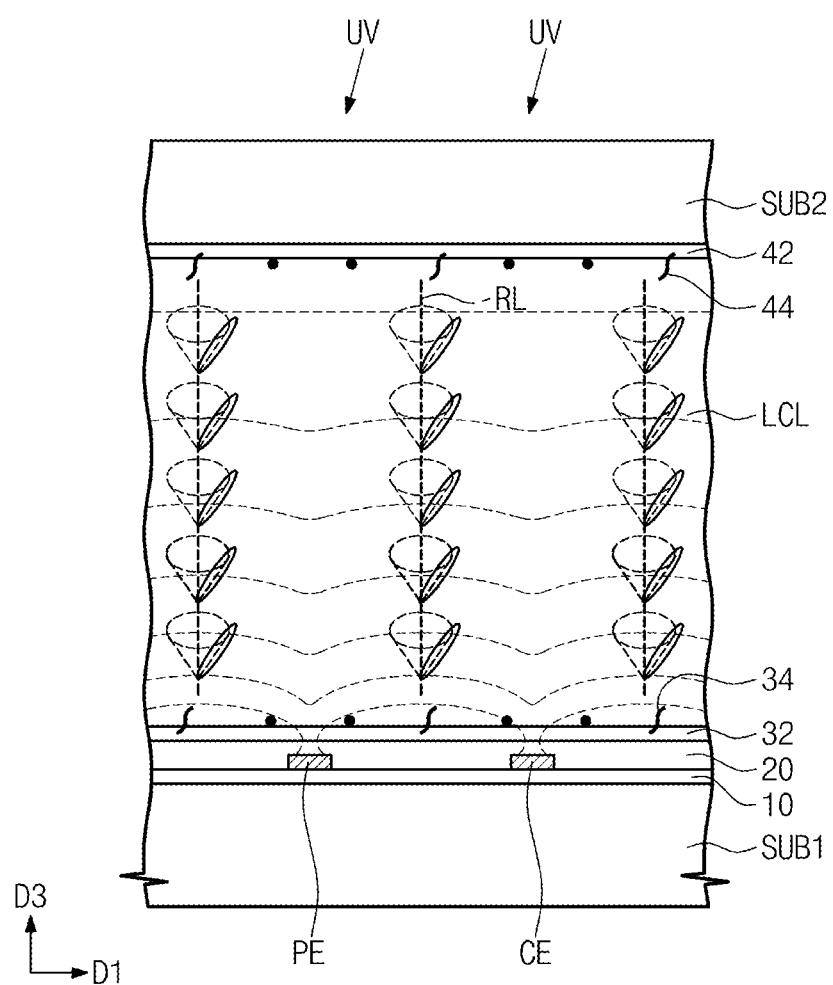

Next, an electric field is applied to the liquid crystal layer LCL (S240). As shown in FIG. 10D, when the electric field is applied to the liquid crystal layer LCL, the spiral ferroelectric liquid crystals are untwisted.

Thereafter, the liquid crystal layer LCL having the electric field formed therein is irradiated with ultraviolet light (S250). As shown in FIG. 10D, the first and second alignment controlling materials 3, 4 included in the first alignment base layer 32 and the second alignment base layer 42 are photopolymerized when the liquid crystal layer LCL is irradiated with ultraviolet light.

Figure 10E:
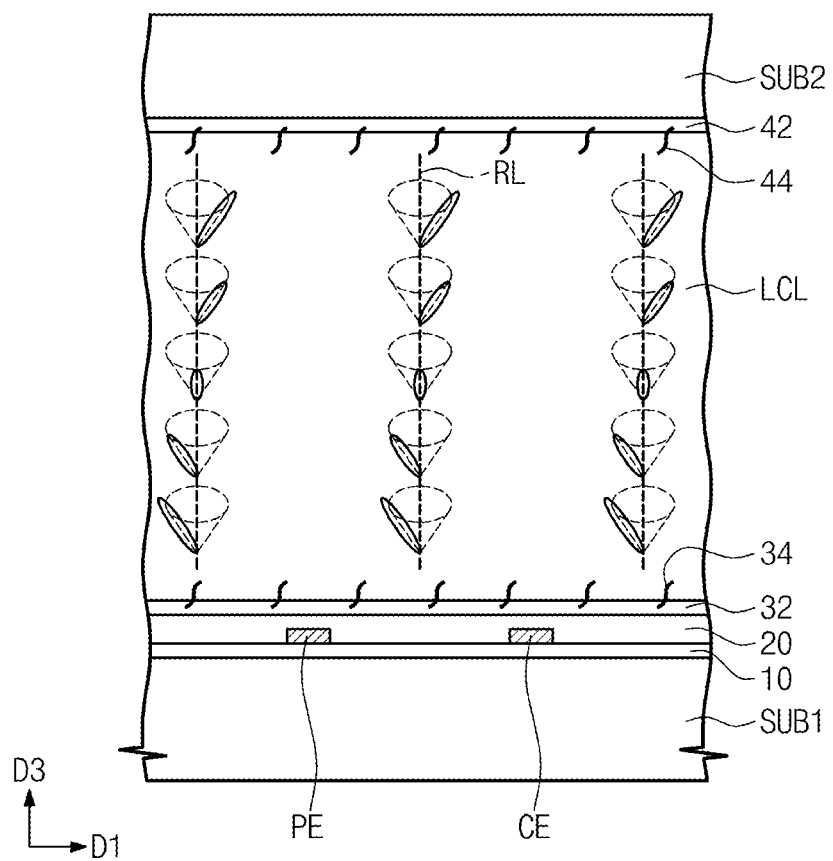

As shown in FIG. 10E, when the photopolymerization of the first and second alignment controlling materials 3, 4 is terminated, the first controlling materials 3 included in the first alignment base layer 32 combine with the first alignment base layer 32 to form a first alignment controller 34. Also, the second controlling materials 4 included in the second alignment base layer 42 combine with the second alignment base layer 42 to form a second alignment controller 44.

The first alignment controller 34 combined with the first alignment base layer 32 pre-tilts liquid crystals adjacent to the first substrate SUB1. The second alignment controller 44 combined with the second alignment base layer 42 pre-tilts liquid crystals adjacent to the second substrate SUB2.

Thereafter, when the electric field is removed from the liquid crystal layer LCL, the ferroelectric liquid crystals are rearranged by orienting into a spiral shape as shown in FIG. 10E.

Alignment stability of the foregoing liquid crystal display device may be improved because the ferroelectric liquid crystals are vertically aligned. As a result, the liquid crystal display device may achieve a low-gradation image close to black and a contrast ratio may be improved.

Also, because the first and second alignment controller 34, 44 pre-tilts the ferroelectric liquid crystals, a cone angle of the ferroelectric liquid crystals is increased. As a result, an apparent cone angle of the ferroelectric liquid crystals is increased and transmittance of the pixel is improved. Further, because the ferroelectric liquid crystals are pre-tilted, a cell gap may be decreased and high-speed driving may be possible at a low voltage.

While the inventive concept as been particularly shown and described with reference to exemplary embodiments thereof, it will be understood by those of ordinary skill in the art that various changes in form and details may be made therein without departing from the spirit and scope of the inventive concept as disclosed herein, including the following claims. The exemplary embodiments should be considered in descriptive sense only and not for purposes of limitation.

What is claimed is:

1. A liquid crystal display device comprising:
a first substrate including a pixel;
a first alignment layer disposed on the first substrate and including a first alignment base layer and a first alignment controller combined with the first alignment base layer, wherein the first alignment base layer includes a vertical alignment material having a first side chain formed of hydrocarbons, the first alignment controller includes a mesogenic material, the first alignment controller combined with the vertical alignment material forms a second side chain, and the second side chain is longer than the first side chain;
a second substrate facing the first substrate;
a second alignment layer disposed on the second substrate and including a second alignment base layer and a second alignment controller combined with the second alignment base layer, wherein the second alignment base layer includes the vertical alignment material of the first alignment base layer, and the second alignment controller includes the mesogenic material of the first alignment controller, and the second side chain is longer than the first side chain in the second alignment layer; and
ferroelectric liquid crystals arranged in a spiral shape between the first alignment layer and the second alignment layer and vertically aligned,
wherein the ferroelectric liquid crystals comprise:
about 60 to 80 parts by weight of a first liquid crystal, the first liquid crystal including at least one selected from the group consisting of the following Chemical Formula 1; and
about 20 to 40 parts by weight of a second liquid crystal expressed by the following Chemical Formula 2:

[Chemical Formula 1]

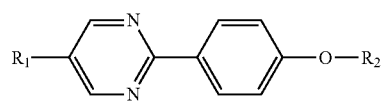

[Chemical Formula 2]

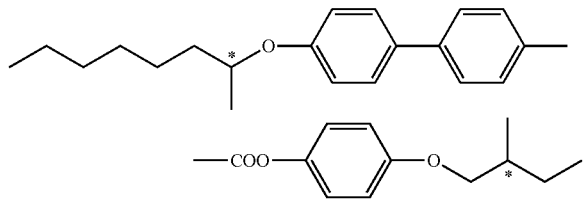

where, $R_1$ and $R_2$ are alkyl groups having a carbon count of about 5 to about 10, respectively.

2. The liquid crystal display device of claim 1, wherein the first alignment base layer comprises a first rubbing axis in a first direction and the second alignment base layer comprises a second rubbing axis in a second direction opposite to the first direction.

3. The liquid crystal display device of claim 1, wherein an angle between liquid crystals pre-tilted by at least one of the first alignment controller and the second alignment controller, and a rotation axis of the spiral shape is in a range of about 35 degrees to about 40 degrees.

4. The liquid crystal display device of claim 3, wherein the first alignment controller and the second alignment controller are photopolymerized reactive mesogens.

5. The liquid crystal display device of claim 1, further comprising a gate line disposed on the first substrate and a data interconnection line insulatively crossing the gate line, wherein the pixel comprises:
a thin film transistor connected to the gate line and the data line;
a pixel electrode connected to the thin film transistor; and
a common electrode forming an electric field with the pixel electrode and disposed by being spaced apart from the pixel electrode in plan view.

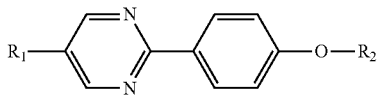

[Chemical Formula 1]

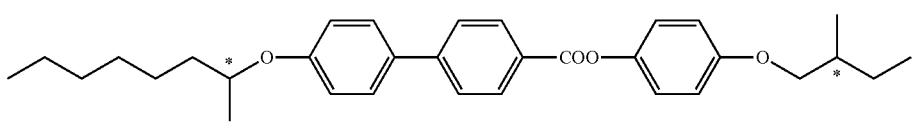

[Chemical Formula 2]

6. The liquid crystal display device of claim 5, wherein the pixel electrode comprises a plurality of first branch portions disposed by being spaced apart and a first connecting portion connecting ends of the first branch portions and connected to the thin film transistor, the common electrode comprises a plurality of second branch portions alternatingly arranged with the plurality of first branch portions and a second connecting portion connecting ends of the second branch portions, and the pixel electrode and the common electrode are disposed on a same layer.

7. A method for manufacturing a liquid crystal display device, the method comprising:
forming a first alignment base layer having a first side chain formed of hydrocarbons on a first substrate including a pixel;
forming a second alignment base layer on a second substrate;
bonding the first substrate and the second substrate having a liquid crystal layer including alignment controlling materials and ferroelectric liquid crystals disposed therebetween;
forming an electric field in the liquid crystal layer by applying a voltage to the pixel; and
irradiating the liquid crystal layer with light to photopolymerize the alignment controlling materials,
wherein a portion of the photopolymerized alignment controlling materials combines with the first alignment base layer to form a first alignment controller and another portion of the photopolymerized alignment controlling materials combines with the second alignment base layer to form a second alignment controller.

8. The method of claim 7, wherein the first alignment base layer and the second alignment base layer comprise a vertical alignment material.

9. The method of claim 8, wherein the alignment controlling materials are a reactive mesogen.

10. The method of claim 7, further comprising rubbing the first alignment base layer and the second alignment base layer in a first direction.

11. The method of claim 7, wherein the ferroelectric liquid crystals are in a nematic phase during the forming of the electric field in the liquid crystal layer and the irradiating of the liquid crystal layer with light.

12. The method of claim 7, wherein the ferroelectric liquid crystals comprise:
about 60 to 80 parts by weight of a first liquid crystal, the first liquid crystal including at least one selected from the group consisting of the following Chemical Formula 1; and
about 20 to 40 parts by weight of a second liquid crystal expressed by the following Chemical Formula 2:

where, $R_1$ and $R_2$ are alkyl groups having a carbon count of about 5 to about 10, respectively.

13. A method for manufacturing a liquid crystal display device, the method comprising:
forming a first alignment base layer including a first alignment controlling material having a side chain formed of hydrocarbons on a first substrate including a pixel;
forming a second alignment base layer including a second alignment controlling material on a second substrate;
bonding the first substrate and the second substrate having a liquid crystal layer including ferroelectric liquid crystals disposed therebetween;
forming an electric field in the liquid crystal layer by applying a voltage to the pixel; and
irradiating the liquid crystal layer with light to photopolymerize the first alignment controlling material and the second alignment controlling material,
wherein the photopolymerized first alignment controlling material combines with the first alignment base layer to form a first alignment controller and the photopolymerized second alignment controlling material combines with the second alignment base layer to form a second alignment controller.

14. The method of claim 13, wherein the first alignment base layer and the second alignment base layer comprise a vertical alignment material.

15. The method of claim 14, wherein the first and second alignment controlling material are a reactive mesogen.

16. The method of claim 13, further comprising rubbing the first alignment base layer and the second alignment base layer in a first direction.

17. The method of claim 13, wherein the ferroelectric liquid crystals are in a nematic phase during the forming of the electric field in the liquid crystal layer and the irradiating of the liquid crystal layer with light.

18. The method of claim 13, wherein the ferroelectric liquid crystals comprise:
about 60 to 80 parts by weight of a first liquid crystal, the first liquid crystal including at least one selected from the group consisting of the following Chemical Formula 1; and about 20 to 40 parts by weight of a second liquid crystal expressed by the following Chemical Formula 2:
[Chemical Formula 1]
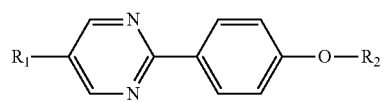
[Chemical Formula 2]
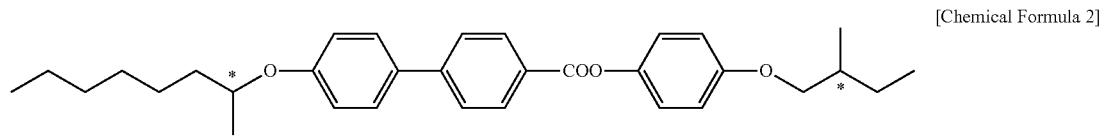
where, $R_1$ and $R_2$ are alkyl groups having a carbon count of about 5 to about 10, respectively.
* * * * *